United States Patent [19]
Monier

[11] Patent Number: 5,751,620
[45] Date of Patent: May 12, 1998

[54] METHOD FOR THE PRODUCTION OF AN ERROR CORRECTION PARAMETER ASSOCIATED WITH THE IMPLEMENTATION OF MODULAR OPERATIONS ACCORDING TO THE MONTGOMERY METHOD

[75] Inventor: Guy Monier, Rognac, France

[73] Assignee: SGS-Thomson Microelectronics S.A., Saint Genis, France

[21] Appl. No.: 551,782

[22] Filed: Nov. 7, 1995

[30] Foreign Application Priority Data

Nov. 8, 1994 [FR] France ..................... 94 13593

[51] Int. Cl.$^6$ .................................................. H04L 9/00
[52] U.S. Cl. ........................................... 364/746.1; 380/28
[58] Field of Search ..................... 371/37.1; 364/746.1, 364/753; 380/28

[56] References Cited

FOREIGN PATENT DOCUMENTS

A-0 566498  10/1993  European Pat. Off. .......... H04L 9/32
A-0 601 907  6/1994  European Pat. Off. .......... G06F 7/72

OTHER PUBLICATIONS

Eldridge et al., "Hardware Implementation of Montgomery's Modular Multiplication Algorithm", IEEE Transactions on Computers, vol. 42, No. 6, Jun. 1993, pp. 693–699.
French Search Report from French Patent Application 94 13593, filed Nov. 8, 1994.
Algebraic Coding, First French–Israeli Workshop Proceedings, First French–Israeli Workshop, Algebraic Coding, Paris, France, 19–21 Jul. 1993, ISBN 3–540–5784309, 1994, Berlin, Germany, Springer–Verlag, Germany, pp. 75–81, Naccache D. et al., "Montgomery–Suitable Cryptosystems".

Advances in Cryptology—Auscrypt '92, Workshop on the Theory and Application of Cryptographic Techniques Proceedings, Gold Coast, OLD., Australia, 13–16 Dec. 1992, ISBN 3–540–57220–1, 1993 Berlin, Germany, Springer–Verlag, Germany, pp. 505–516, Sauerbrey J., "A Modular Exponentiation Unit Based on Systolic Arrays".
Advances in Cryptology—Eurocrypt '90, Workshop on the Theory and Application of Crytographic Techniques Proceedings, AARHUS, Denmark, 21–24 May 1990, ISBN 3–540–53587–X, 1991 Berlin, Germany, Springer–Verlag, Germany, pp. 230244, Duxse S. R. et al., "A Cryptographic Library for the Motorola DSP56000".

*Primary Examiner*—Stephen M. Baker
*Attorney, Agent, or Firm*—Wolf, Greenfield & Sacks, P.C.; James H. Morris

[57] ABSTRACT

A method for producing a binary error correction parameter $H=2^{2*m*k} \bmod N$ with N being a binary data element, called a modulo, encoded on m words of k bits each. This method includes the following steps:

1. loading of the modulo N into a first n-bit register with n=m*k and initialization of a second n-bit register at B(0)=0
2. production and storage of a data element B(1)=2*(B(0)–N) by bit-by-bit subtraction of B(0) and N, and left shift by one unit of the result, denoted R(0), of the bit-by-bit subtraction, and comparison of B(1) and N,
3. production of a data element $H_{int}=2^{n+v} \bmod N$ with v=(m*k)/2p, with p as an integer by the implementation of the following processing operation:
   for i as an integer from 1 to v,
   if B(i)<N then B(i+1)=2*B(i)-0),
   else B(i+1)=2*(B(i)-N),
   and bit-by-bit comparison of B(i+1) and N,
4. production of the parameter H by the performance of p $P_{field}$ operations $H_{int}(j)=P(H_{int}(j-1), H_{int}(j-1))N$, with j as an index ranging from 1 to p and $H_{int}(0)=B(v+1)$ or B(v+1)–N.

13 Claims, 2 Drawing Sheets

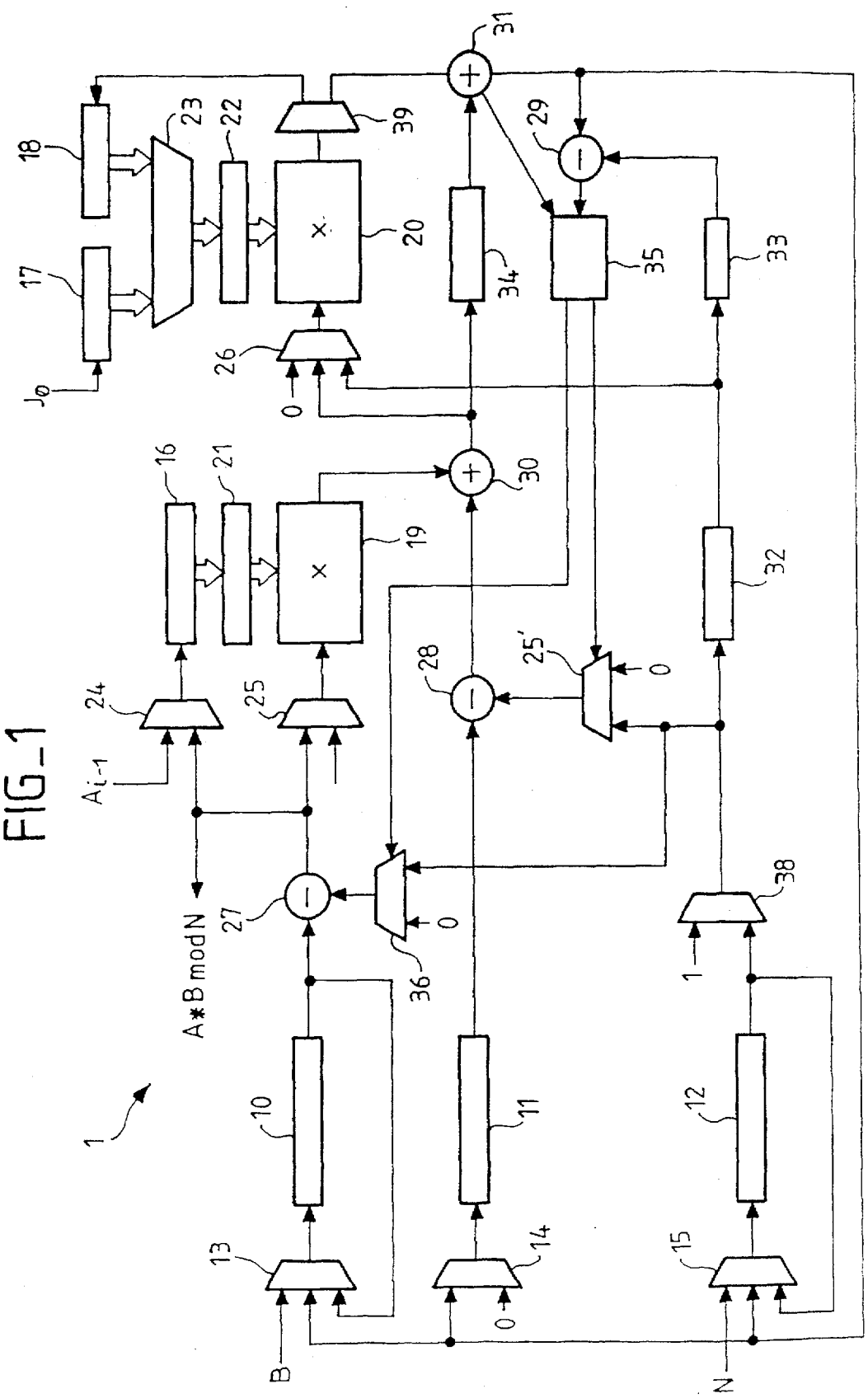
FIG_1

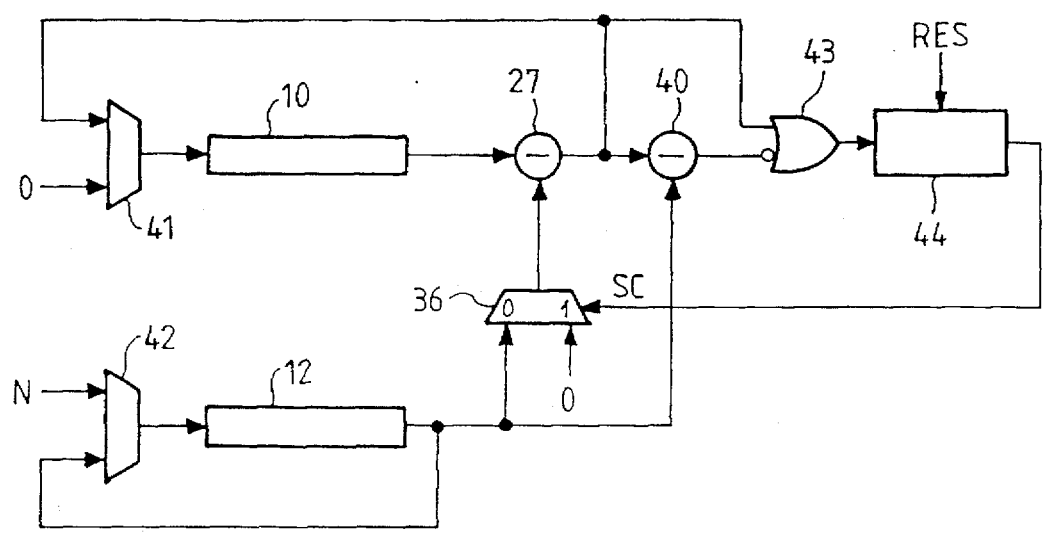
FIG_2

METHOD FOR THE PRODUCTION OF AN ERROR CORRECTION PARAMETER ASSOCIATED WITH THE IMPLEMENTATION OF MODULAR OPERATIONS ACCORDING TO THE MONTGOMERY METHOD

BACKGROUND OF THE INVENTION

1. Field of the Invention

The invention relates to a method for the production of an error correction parameter associated with the implementation of modular operations according to the Montgomery method. This method makes it possible to carry out modular computations in a finite field (or Galois field) denoted GF(2n) without the performance of divisions.

2. Discussion of the Related Art

Conventionally, modular operations on GF(2n) are used in cryptography for applications such as authentication of messages, identification of a user and exchange of keys. Such exemplary applications are described, for example, in the French patent application published under No. 2 679 054.

There are commercially available integrated circuits dedicated to such applications. These include, for example the product referenced as ST16CF54 manufactured by SGS-THOMSON MICROELECTRONICS S.A., built around an association of the type comprising a central processing unit and an arithmetic coprocessor and dedicated to the performance of modular computations. The coprocessor used enables the processing of the modular operations by using the Montgomery method. It is the object of a European patent application filed under the reference No. 0 601 907 A2, and is illustrated in FIG. 1 (this figure corresponds to FIG. 2 of the European patent application referred to).

The basic operation, called a Pfield operation, consists of the production, on the basis of three binary data elements A (multiplicand), B (multiplier) and N (modulo) encoded on an whole number of n bits of a binary data element denoted $P(A;B)_N$ encoded on n bits, such that $P(A,B)_N = A*B*I \bmod N$, with I as a binary data element encoded on n bits such that $I = 2^{-n} \bmod N$. For this purpose, it is assumed that the data elements are encoded on m words of k bits, with $m*k=n$, and the words of the data elements A and B are given to a multiplication circuit having a serial input, a parallel input and a serial output.

In the coprocessor described in the European patent application referred to, we have k=32 and m=8 or 16.

This circuit is used especially to produce the result of the modular multiplication A*B mod N.

From this viewpoint, the circuit illustrated in FIG. 1 is used to implement a method including the following steps:

1. Computation of a parameter H ($H=2^{2*n} \bmod N$) and a parameter $J_0$ encoded on k bits, with $J_0 = -N_0^{-1} \bmod 2^k$, $N_0$ being the least significant word of the modulo N, and storage of $J_0$ in a k-bit register 17.

2. Loading of the multiplier B and of the modulo N in respective n-bit registers 10 and 12, with n=m*k, and initialization of an n-bit register 11 at zero, the contents of this register being denoted S, with S as a variable binary data element encoded on n bits.

3. Setting up a loop, indexed i, with i varying from 1 to m, each ith iteration comprising the following steps:

a) the transfer of the $i^{th}$ word $A_{i-1}$ of the multiplicand A from a register 16 to a storage flip-flop circuit 21, b) the production of a value $X(i)=S(i-1)+B*A_{i-1}$ with S(0)=0 and S(i-1) as the so-called updated value of S, defined hereafter, by:

I—making a right shift of the contents of the register 10 to the input of a first serial-parallel multiplication circuit 19 with the looping of the output of the register 10 to its input, II—multiplying the bits of B by $A_{i-1}$, III—making a right shift of the contents of the register 12, with looping of the output to the input, IV—determining the updated value of S(i-1) as being the value stored in the register 11 after the $(i-1)^{th}$ iteration, if this updated value is smaller than N and, if this updated value is greater than N, making a serial subtraction of N from this updated value in a first serial subtraction circuit 28, the value that results therefrom being the updated value of S(i-1), and V—making a right shift of the contents of the register 11 and carrying out a bit-by-bit addition of the value of the multiplication $B*A_{i-1}$ to the updated value of S(i-1) in a first serial addition circuit 30, c) multiplication of the least significant word of X(i), $X_0(i)$, by $J_0$ in a second serial-parallel multiplication circuit 20, and entering the value $X_0(i)*J_0 \bmod 2^k = Y_0(i)$ into a register 18, and simultaneously the delaying of N and X(i) by k cycles in delay circuits 32 and 34, d) computation of a value $Z(i)=X(i)+Y_0(i)*N$ by:

I—multiplying $Y_0(i)$ by N, delayed by k cycles, in the second multiplication circuit 20, and II—adding X(i) to the value $Y_0(i)*N$ in a second serial addition circuit 31, e) not taking account of the least significant word of Z(i) and storing the remaining words, namely $Z(i)/2^k$, in the register 11, f) making a bit-by-bit comparison of $Z(i)/2^k$ with N in order to determine the updated value S(i) of the next iteration, in the manner described here above, this comparison being done through the bit-by-bit subtraction of $Z(i)/2^k$ and N in a second serial subtraction circuit 29, N having been delayed by k additional cycles, g) the $i^{th}$ word of the multiplicand A being loaded into the register 16 at any instant during the above operations.

4. At the $m^{th}$ iteration, ignoring the least significant word of Z(m) and entering the remaining words, namely $Z(m)/2^k$, into the register 10.

5. Repeating the steps 3 and 4 in which $Z(m)/2^k$ is substituted for B and H for A, and $Z(m)/2^k$ or $(Z(m)/2^k)-N$ is provided by means of a third serial subtraction circuit 27 to the multiplication circuit 19 (if $Z(m)/2^k \geq N$).

6. Output of the result stored in the register 10 at the last iteration, possibly subtracted from N if necessary.

On the whole, if the period of the clock signal synchronizing the operation of the circuit of FIG. 1 is called a cycle, then the time needed for the processing of a modular multiplication can be broken down chiefly into:

n*(n+1) cycles for the computation of H, n cycles for the step 2, m*(n+2*k+x) cycles for the combined steps 3 and 4 on the one hand and for the step 5 on the other hand with x as an integer, n cycles for the step 6.

In practice, x is a function of the initialization of the circuit, i.e. chiefly of the setting up of the control signals (of multiplexers for example) to ensure the consistent operation of the circuit. In practice, it may be considered for example that x=7.

With regard to the first step, the computation of the parameter $J_0$ is done by the central processing unit (software method).

It can be shown that H is a function of the size of the register 16 and of the number of times in which this register is used in a loop. We have $H=2^{2*n}$ mod N. This parameter is an error correction parameter. Indeed the step 4 produces a result having the form A*B*I, with $I=2^{-n}$ mod N. We have $H*I^2=1$ mod N. This enables a precise result to be given, namely a result equal to the result of the modular multiplication A*B mod N, during the step 7 of the modular multiplication method described here above.

The computation of H is done by means of the coprocessor, according to the following method described with reference to FIG. 2 which corresponds to FIG. 9 of the European patent application referred to.

To compute H, the following operation is performed (see also page 20, line 47 to page 25, line 52 of the above-mentioned European patent):

1. loading of N in the register 12 and initialization of the register 10 at B(0)=0, 2. simultaneously:
   right shift and bit-by-bit subtraction of B(0) and N in a serial subtractor 27 with a left shift by one unit of the result $R(0)=B(0)-N$ mod $2^n$, the shift being done in the subtractor in putting out a first bit at 0,
   loading of B(1)=2*R(0) in the register 10,
   bit-by-bit subtraction of 2*R(0) and N to determine whether 2*R(0) is≧or<N, this subtraction being done in a second subtractor 40, with the testing, in a circuit 44, of the result of the subtraction, 3. setting up of a loop with an index i, with i ranging from 1 to a, each iteration comprising the following operations:
   if B(i)<N then loading of B(i+1)=2*(B(i)-0) in the registers 10,
   else loading of B(i+1)=2*(B(i)-N) in the register 10. We have $B(n+t)=H=2^{2*n}$ mod N.

The inventor has sought to improve the implementation of modular operations by the coprocessor shown in FIG. 1 in order to reduce the periods of time i needed for the implementation of these operations. More particularly, the inventor has sought to improve the method used to compute the error correction parameter H.

SUMMARY OF THE INVENTION

Thus, the invention provides a method for the production of a binary error correction parameter $H=2^{2*m*k}$ mod N with N being a binary data element, called a modulo, encoded on m words of k bits each, wherein said method comprises the following, steps:

1. loading of the modulo N in a first n-bit register with n=m*k and initialization of a second n-bit register at zero, the contents of the second register being denoted B(0), 2. production and storage of a data element B(1)=2(B(0)−N) encoded on n bits by:
   right shift in both registers and the bit-by-bit subtraction of the contents of the first and second registers with a left shift by one unit of the result, denoted R(0), of the bit-by-bit subtraction,
   loading of the result of the subtraction after shifting, denoted B(1), in the second register,
   comparison of B(1) and N, 3. production of a data element $H_{int}=2^{n+v}$ mod N encoded on n bits with v as an integer such that v=(m*k)/2p, with p as an integer by:
   setting up a loop indexed by an index i, i being an integer ranging from 1 to v, each $i^{th}$ iteration comprising the following operations:
   if B(i)<N then loading into the second register of B(i+1)=2*B(i) after a left shift of B(i) by one unit, and bit-by-bit comparison of B(i) and N,
   else bit-by-bit subtraction of N and B(i) with a left shift by one unit of the result and loading into the second register of B(i+1)=2*(B(i)−N), and bit-by-bit comparison of B(i+1) and N, 4. production of the parameter H by the performance of p operations $H_{int}(j)=P(H_{int}(j-1), H_{int}(j-1))_N$, with j as an index ranging from 1 to p and $H_{int}(0)=B(v+1)$ or B(v+1)−N.

The invention therefore proposes the computation of H by carrying out, firstly, subtractions smaller in number than in the known method and, secondly, Pfield operations.

In the prior art method, the time needed to compute H was n*(n+1) cycles.

In the method according to the invention, the computation time is n*(v+1)+p*m *(n+2*k+x) cycles.

For m=16, the prior art method required 262 656 cycles. With, for example, v=2*m=32, namely p=4, and assuming that x=7, the method according to the invention requires no more than 54 208 cycles, giving a gain in time of about 80%.

The time needed to produce the parameter H is of course a function of v. The choice of v=2*m, namely $p=\log_2(k)-1$, corresponds to the optimization of the method, namely the minimization of the period needed to produce H as compared with the existing circuit.

Furthermore, the production of H as defined in the known method and according to the novel method described here above, entails an assumption that the most significant bit of the modulo is equal to 1. This clearly restricts the choice of this modulo. The inventor therefore proposes extending the computation of H to the case where the modulo N is encoded on a number lof useful bits smaller than n, in other words to the case where a modulo N would be chosen with n−1 least significant bits at 0.

Thus, the invention also proposes a method for the production of a binary error correction parameter $H=2^{2*m*k}$ mod N with N as a binary data element, called a modulo element, encoded on m words of k bits each, N having n−1 most significant bits at zero, with n=m*k and 1<n, wherein said method comprises the following steps:

1. the loading of the modulo N in a first n-bit register with n=m*k and initialization of a second n-bit register at zero, the contents of the second register being denoted B(0), 2. a right shift with the looping, to its input, of 1 bits of the first register, 3. the production and storage of a data element B(1)=2* (B(0)−N') encoded on n bits, with $N'=N*2^{n-1}$, by:
   a right shift in both registers and the bit-by-bit subtraction of the contents of the first and second registers with a left shift by one unit of the result, denoted R(0), of the bit-by-bit subtraction,
   the loading of the result of the subtraction after shifting, denoted B(1), in the second register,
   the comparison of B(1) and N', 4. production of a data element $H_{int}=2^{n+v-1+v}$ mod N' encoded on n bits with v as an integer such that v=(m*k)/2p, with p as an integer by:
   the setting up of a loop with an index i, i being an integer ranging from 1 to n−1+v, each $i^{th}$ iteration comprising the following operations:
      if B(i)<N' then the loading into the second register of B(i+1)=2*B(i) after a left shift of B(i) by one unit, and bit-by-bit comparison of B(i+1) and N',
      else bit-by-bit subtraction of N' and B(i) with a left shift by one unit of the result and loading into the second register of B(i+1)=2*(B(i)−N'), and bit-by-bit comparison of B(i+1) and N',
5. if B(n−1+v+1)≧N': bit-by-bit subtraction of B(n−1+v+1) and N', and loading into the second register of B(n−1+v+1)−N',
6. right shift of n−1 bits in the first and second registers,
7. the production of the parameter H by the performance of p operations $H_{int}(j)=P(H_{int}(j-1), H_{int}(j-1))_N$, with j as an index ranging from 1 to p and $H_{int}(0)=B(n-1+v+1)*2^{1-n}$ or $(B(n-1+v+1)-N')*2^{1-n}$.

Just as in the method described here above, it shall be assumed advantageously that v =2*m, i.e. p=$\log_2$(k)−1.

BRIEF DESCRIPTION OF THE DRAWINGS

The invention will be understood more clearly and other features and advantages shall appear from the following description of embodiments of the invention. This description is given as an indication that in no way restricts the scope of the invention, and is to be read in conjunction with the appended drawings, of which:

FIG. 1 gives a schematic view of a circuit enabling, the performance of the modular operations according to the Montgomery method, FIG. 2 shows a circuit implemented in the computation of an error correction parameter according to the invention.

DETAILED DESCRIPTION

FIG. 1 shows a circuit 1 for the processing of modular operations.

This circuit comprises:
   three shift registers 10, 11 and 12 with serial input and output. Each of these registers has the same number n of cells, with n=m*k. These registers could be such that they can be divided, for example into registers of n/2 cells and into registers of k bits for the registers 10 and 12,
   multiplexers 13, 14 and 15 are placed respectively before the register 10, 11 and 12. Multiplexers will also be placed before the subdivisions if these subdivisions exist,
   three registers 16, 17 and 18 each comprising k cells. The registers 16, 17 and 18 are parallel output and serial input registers,
   two multiplication circuits 19 and 20, each comprising one serial input, one parallel input and one serial output. The parallel input of the multiplication circuit 19 is connected to the output of the register 16 by means of a storage flip-flop circuit 21 having k cells. The parallel input of the multiplication circuit 20 is connected to one of the outputs of the registers 17 or 18, by means of a storage flip-flop circuit 22 having k cells. This flip-flop circuit 22 is itself connected to one of the outputs of the registers 17 and 18 by means of a multiplexer with two parallel inputs and one parallel output, multiplexers 24, 25, 25', 26, 36 and 38,
a demultiplexer 39,
serial subtraction circuits 27, 28 and 29,
serial adder circuits 30 and 31,
delay circuits 32, 33 and 34 to delay the propagation of binary data elements by k cycles,
a storage circuit 35 to store the result of the comparison.

For further details, reference could be made to the European patent application EP-0 601 907 A2 and especially to FIG. 3 of this application and to the passages in the description pertaining thereto: these are page 15, line 54, to page 16, line 13, and page 17, line 50, to page 18, line 55.

FIG. 2 shows a circuit comprising:
   the two shift registers 10 and 12, the subtraction circuit 27, the multiplexer 36,
   two multiplexers with two inputs 41 and 42, the respective outputs of which are connected respectively to the inputs of the registers 10 and 12,
   a serial subtraction circuit 40,
   a two-input NAND gate 43,
   a storage circuit 44 to store the result of the comparison.

The subtraction circuits 27 and 40 have two serial inputs and one serial output.

The subtraction circuit 27 has a first input connected to the output of the register 10. The output of this subtraction circuit 27 is connected to a first input of the subtraction circuit 40. The subtraction circuit 40 has its second input connected to the output of the register 12, and its output connected to an inverter input of the gate 43.

The other (non-inverter) input of the gate 43 is connected to the output of the subtraction circuit 27. Its output is connected to an input of the circuit 44. This circuit 44 has another input to receive a resetting signal RES.

The multiplexer 36 has two inputs and one output. Its output is connected to the second input of the subtraction circuit 28. Its inputs are connected respectively to the output of the register 12 and to a ground (potential corresponding to a logic 0). The multiplexer 36 selectively connects its output to its first or second input depending on the state of a selection signal SC received from the circuit 44 (for example to the first input if SC=0, and to the second input if SC=1).

The multiplexer 41 has its inputs connected respectively to the output of the subtraction circuit 27 and to the ground.

The multiplexer 42 has its inputs connected respectively to the output of the register 12 and to an input terminal for the serial reception of a binary data element (in practice, the modulo N).

The circuit of FIG. 2 is used to produce an error correction parameter H which is a binary data element encoded on n bits.

We have H=$2^{2*n}$ mod N.

It is assumed that the modulo N is encoded on 1 useful bits, with 1≦n, i.e. that modulo N has its n−1 most significant bits in the state 0.

The computation of H calls for the following steps:
if 1=n:
   1—the loading of N into the register 12 and, in parallel, the loading of B(0)=0 (n bits at 0) into the register 10, and the initializing of the circuit 44 (namely the production of the signal RES such that SC=0),
   2—the output of N and B(0) by the right shifting in both registers 10 and 12 of the contents of these registers, the input of the register 10 being connected to the output of the subtraction circuit 27 and the input of the register 12 being connected to its output, the bit-by-bit subtraction, in the subtraction circuit 27, of the bits of N and B(0) as and when these bits come out, with a left shift by one unit of the result noted R(0)=B(0)–N, the loading of B(1)=2*R(0) into the register 10, the bit-by-bit subtraction, in the subtraction circuit 40, of B(1) and N, to ascertain whether B(1) is≧or<N, and the production, by the circuit 44, of SC=0 if B(1)≧N, and if not the production of SC=1, 3—the setting up of a loop with an index i, i being an integer from 1 to v, with v as an integer such that v=(m*k)/2p, with p as an integer, each $i^{th}$ iteration comprising the resumption of the operations of the step 2 and being expressed by the following:

if B(i)<N (SC=1), then loading into the register 10 of B(i+1)=2*B(i)=2*(B(i) –0), else (SC=0), loading into the second register of B(i+1)=2*(B(i)–N).

Ultimately, we have B(v+1) in the register 10 and N in the register 11.

4—p operations $P_{Field}$ by means of the circuit of FIG. 1, with $H_{int}(0)$=B(v+1), or B(v+1)–N if B(v+1)≧N, for j from 1 to p:

production of $H_{int}(j)$=P($H_{int}(j-1)$, $H_{int}(j-1))_N$.

We have H=$H_{int}(p)$.

For the performance of the operations $P_{field}$ by the circuit of FIG. 1, reference will be made to the European patent application referred to here above, page 19, line 5 to page 20, line 45.

The method implemented is the following:

1. The computation of a parameter $J_0$ encoded on k bits, with $J_0=-N_0^{-1}$ mod $2^k$, $N_0$ being the least significant word of the modulo N, storage of $J_0$ in the k-bit register 17.

2. The initializing of the register 11 at zero, the contents of this register being denoted S, with S as a binary variable data element encoded on n bits.

3. The setting up of a loop, with an index i, with i varying from 1 to m, each $i^{th}$ iteration comprising the following operations:

a) if i=1, then a right shift in the register 10 with looping of its input with output, and transfer of the first word of B(v+1) or B(v+1)–N (by means of the subtraction circuit 27) into the register 16 and the flip-flop circuit 21, and if i>1, then transfer of the $i^{th}$ word $B_{i-1}$ of B(v+1) or B(v+1)–N from the register 16 to the flip-flop circuit 21, b) the production of a value X(i)=S(i–1)+B*$B_{i-1}$ with S(0)=0 and S(i–1) being the so-called updated value of S, defined hereafter by:

I—making a right shift of the contents of the register 10 towards the input of a first serial-parallel multiplication circuit 19 with the looping of the output of the register 10 to its input, II—multiplying the bits of B by $B_{i-1}$, III—making a right shift of the contents of the register 12, with looping of the output to the input, IV—determining the updated value of S(i–1) as being the value stored in the register 11 after the $(i-1)^{th}$ iteration if this updated value is smaller than N and, if this updated value is greater than N, making a serial subtraction of N from this updated value in a first serial subtraction circuit 28, the value that results therefrom being the updated value of S(i–1), and V—making a right shift of the contents of the register 11 and carrying out a bit-by-bit addition of the value of the multiplication B*$B_{i-1}$, with the updated value of S(i–1) in a first serial addition circuit 30, c) the multiplication of the least significant word of X(i), $X_0(i)$, by $J_0$ in the serial-parallel multiplication circuit 20, and the entering of the value $X_0(i)*J_0$ mod$2^k$=$Y_0(i)$ in the register 18, and simultaneously the delaying of N and X(i) by k cycles in the delay circuit 32, d) the computation of a value Z(i)=X(i)+$Y_0(i)$*N by:

I—multiplying $Y_0(i)$ by N, delayed by k cycles, in the second multiplication circuit 20, and II—adding X(i) to the value $Y_0(i)$*N in a second serial addition circuit 31, e) not taking account of the least significant word of Z(i) and storing the remaining words, namely Z(i)/$2^k$, in the register 11, f) making a bit-by-bit comparison of Z(i)/$2^k$ with N in order to subsequently determine the updated value S(i) in the manner described here above, this comparison being done through the bit-by-bit subtraction of Z(i)/$2^k$ and N, delayed by k additional cycles in the circuit 33, in the second serial subtraction circuit 29, g) the $(i+1)^{th}$ word of the B(v+1) or B(v+1)–N being loaded into the register 16 when it comes out of the register 10, during the above operations.

4. At the $m^{th}$ iteration, ignoring the least significant word of Z(m) and entering the remaining words, namely Z(m)/$2^k$, into the register 10.

5. Repeating the steps 3 and 4 (p–1) times,

6. Output of the result stored in the register 10 at the last iteration, possibly subtracted from N if necessary (by mains of the substraction circuit 27).

if1<n:

The procedure will comprise the following steps:

1—the loading of N in the register 12 and, in parallel, the loading of B(0)=0 (n bits at 0) in the register 10, and the initializing of the circuit 44 (namely the production of the signal RES such that SC=0), 2. the right shift of 1 bits of the contents of the registers 10 and 12, with looping of the inputs of the registers to their outputs, 3—the output of N'=N*$2^{n-1}$ and B(0) by the right shifting in both registers 10 and 12 of the contents of these registers, the input of the register 10 being connected to the output of the subtraction circuit 27 and the input of the register 12 being connected to its output, the bit-by-bit subtraction, in the subtraction circuit 27, of the bits of N' and B(0) as and when these bits come out, with a left shift by one unit of the result noted R(0)=B(0)–N', the loading of B(1)=2*R(0) into the register 10, the bit-by-bit subtraction, in the subtraction circuit 40, of B(1) and N', to ascertain whether B(1) is>or<N', and the production, by the circuit 44, of SC=0 if B(1)>N', and if not the production of SC=1, 4—the setting up of a loop with an index i, i being an integer ranging from 1 to n–1+v, with v as an integer such that v=(mk)/2p, with p as an integer, each $i^{th}$ iteration comprising the resumption of the operations of the step 2 and being expressed by the following:

if B(i)<N' (SC=1), then loading into the register 10 of B(i+1)=2*B(i)=2*(B(i) –0), else (SC=0), loading into the second register of B(i+1)=2*(B(i)−N').

5. If B(n−1+v+1)≧N', bit-by-bit subtraction of B(n−1+v+1) and of N' in the subtraction circuit 27, giving 2*(B(n+v−1+1)−N'), this data element being stored in the register 10 with a right shift to obtain $2^{n+(n-1)+v}$ mod N' in the register 10.

6. Right shift by n−1 bits in the registers 10 and 12.

We thus have N in the register 12, and $2^{n+v}$ mod N in the register 10.

7—p operations $p_{field}$ by means of the circuit of FIG. 1, with $H_{int}(0)=B(n-1+v+1)*2^{1-n}$ or B(n−1+v+1)−N') $*2^{1-n}$ if B(n−1+v+1)≧N', for j from 1 to p: production of $H_{int(j)=P(Hint}(j-1),H_{int}(j-1))_N$.

In the above method, it will be noted that there are two differences with respect to the method implemented in the case where l=n:

there are two additional shifting steps (steps 2 and 6), there is a variable number of iterations during the step for the production of $H_{int}$.

With regard to the step 2, the operation could be limited to making a shift solely in the register 12, all the bits stored in the register 10 being equal.

As compared with the case where l=n, the period of computation will be variable according to the value of l. Indeed, the time needed to produce H will now be n*(n−1+v+1) cycles for the subtraction operations (depending on l), p*m*(n+2*k+x) cycles for the squaring operations (unchanged) and n cycles for the shifts.

The total time taken to compute H will therefore be given by the formula: n*(n−1+v+2)+p*m*(n+2*k+x).

For n=512, x=7, v=32, we will have a period of:
185 280 cycles if l=257,
112 064 cycles if l=400,
55 232 cycles if l=511.

It was assumed with reference to FIG. 2 that the resources of the circuit of FIG. 2 were used. This makes it possible to reduce the total size of the coprocessor to the minimum. Of course, it is possible to use a circuit dedicated solely to the production of H.

The invention is particularly advantageous inasmuch as it can be implemented without modifying the existing circuits illustrated in FIGS. 1 and 2. All that is modified is the sequencing circuit enabling the production of the different control signals needed for the working of these circuits. In particular, it might be necessary to take account of the useful size of the modulo N.

As we have seen, the invention enables a gain in time as compared with the prior art. For n=512 or 256, and k=32, the inventor has shown that p=log$_2$(k)−1=4 represents the most efficient compromise as regards the time taken to compute H. We will then have v=2*=32 or 16 depending on the value of n.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for producing a binary error correction parameter encoded on m words of k bits each, wherein said method comprises the following steps:

(A) loading a modulo N in a first n-bit register with n=m*k and initializing a second n-bit register at zero, the contents of the second register being denoted B(0);

(B) producing and storing a data element B(1)=2* (B(0)−N) encoded on n bits by:
right shifting the first and second registers, bit-by-bit subtracting the contents of the first and second registers, and left shifting by one unit a result, denoted R(0), of the bit-by-bit subtraction;
loading the result of the subtraction after shifting, denoted B(1), in the second register;

(C) producing a data element $H_{int}=2^{n+v}$ mod N encoded on n bits by repeating, for i iterations where i is an integer ranging from 1 to v=(m*k)/2p and p is an integer, the following operations:
bit-by-bit comparing B(i) and N;
if B(i)<N, loading into the second register B(i+1)=2*B(i) by left shifting B(i) by one unit; and
if B(i)≧N, bit-by-bit subtracting N and B(i), left shifting by one unit a result of the subtraction, and loading the left shifted result B(i+1)=2* (B(i)−N) into the second register;

(D) producing the parameter by performing p P$_{field}$ operations $H_{int}(j)=P(H_{int}(j-1), H_{int}(j-1))_N$, with j being an index ranging from 1 to p and $H_{int}(0)$ equaling B(v+1) when B(v+1)<N and equaling B(v+1)−N when B(v+1)≧N; and (E) using the parameter to one of encrypt and decrypt a message.

2. A method to claim 1, wherein p=log$_2$(k)−1.

3. A method for the production of a binary error correction parameter encoded on m words of k bits each, wherein said method comprises the following steps:

(A) loading a modulo N in a first n-bit register with n=m*k,N having n−1 most significant bits at zero with l<n, and initializing a second n-bit register at zero, the contents of the second register being denoted B(0);

(B) right shifting l bits of the first register and looping the l bits to an input of the first register;

(C) producing and storing a data element B(1)=2* (B(0)−N') encoded on n bits, with N'=N*$2^{n-1}$, by:
right shifting the first and second registers, bit-by-bit subtracting the contents of the first and second registers, and left shifting by one unit a result, denoted R(0), of the bit-by-bit subtraction;
loading the result of the subtraction after shifting, denoted B(1), in the second register;

(D) producing a data element $H_{int}=2^{n+(n-1)+v}$ mod N' encoded on n bits by repeating, for i iterations where i is an integer ranging from 1 to n−1+v where v=(m*k)/2p and p is an integer,
the following operations: bit-by-bit comparing B(i) and N';
if B(i)<N', loading into the second register B(i+1)=2* B(i) by left shifting B(i) by one unit; and
if B(i)≧N' bit-by-bit subtracting N' and B(i), left shifting by one unit a result of the subtraction, and loading the left shifted result B(i+1)=2* (B(i)−N') into the second register;

(E) if B(n−1+v+1)≧N', bit-by-bit subtracting B(n−1+v+1) and N', and loading into the second register B(n−1+v+1)−N';

(F) right shifting n−1 bits in the first and second registers;
(G) producing the parameter by performing p P$_{field}$ operations $H_{int}(j)=P(H_{int}(j-1), H_{int}(j-1))_N$, with j being an index ranging from 1 to p and $H_{int}(0)$ equaling $B(n-1+v+1)*2^{1-n}$ when $B(n-1+v+1)<N'$ and equaling $(B(n-1+v+1)-N')*2^{1-n}$ when $B(n-1+v+1) \geq N$; and (H) using the parameter to one of encrypt and decrypt a message.

4. A method to claim 3, wherein $p=\log_2(k)-1$.

5. A method of one of encrypting and decrypting a message, the method comprising the steps of:

(A) loading a modulo N encoded on m words of k bits each into a first n-bit register where $n=m*k$;

(B) initializing a second n-bit register to zero;

(C) subtracting a contents of the first register from a contents of the second register bit-by-bit;

(D) left shifting a subtracted result of step (C) by one bit to multiply the result by 2;

(E) loading a left-shifted result of step (D) back into the second register;

(F) repeating, for i iterations where i is an integer ranging from 1 to $m*k/2p$, and p is an integer, steps of:
 comparing the contents of the first and second registers bit-by bit;
 left shifting the contents of the second register by one bit to multiply the contents of the second register by 2 and loading the left shifted contents back into the second register when the contents of the second register is less than the contents of the first register; and
 subtracting the contents of the first register from the contents of the second register bit-by-bit, left shifting a result of the bit-by-bit subtraction by one bit to multiply the result by 2, and loading the left-shifted result of the bit-by-bit subtraction back into the second register when the contents of the second register is not less than the contents of the first register;

(G) performing p $P_{field}$ operations using the contents of the second register after step (F); and (H) using the contents of the second register after step (G) to one of encrypt or decrypt the message.

6. The method of claim 5 wherein $p=\log_2(k)-1$.

7. The method of claim 5 wherein steps (A)–(G) are performed by a coprocessor using fewer than $n*(n+1)$ clock cycles.

8. The method of claim 5, wherein step (G) includes a step of performing p $P_{field}$ operations using the contents of the second register after step (F) when the contents of the second register after step (F) are less than the contents of the first register after step (F).

9. The method of claim 5 wherein step (G) includes steps of:
 subtracting the contents of the first register from the contents of the second register bit-by-bit and loading the result of the bit-by-bit subtraction back into the second register when the contents of the second register after step (F) are not less than the contents of the first register after step (F) prior to performing the p $P_{field}$ operations.

10. A method of one of encrypting and decrypting a message, the method comprising the steps of:

(A) loading a modulo N encoded on m words of k bits each into a first n-bit register where N has n-1 most significant bits at zero with $n=m*k$ and $1<n$;

(B) right shifting a contents of the first register by 1 bits and looping the 1 bits back into the first register;

(C) initializing a second n-bit register to zero;

(D) subtracting a contents of the first register from a contents of the second register bit-by-bit;

(E) left shifting a subtracted result of step (D) by one unit to multiply the result by 2;

(F) loading a left-shifted result of step (E) back into the second register;

(G) repeating, for i iterations where i is an integer ranging from 1 to $m*k/2p+(n-1)$, and p is an integer, steps of:
 comparing the contents of the first and second registers bit-by bit;
 left shifting the contents of the second register by one unit to multiply the contents of the second register by 2 and loading the left shifted contents back into the second register when the contents of the second register is less than the contents of the first register; and
 subtracting the contents of the first register from the contents of the second register bit-by-bit, left shifting a result of the bit-by-bit subtraction by one unit to multiply the result by 2, and loading the left-shifted result of the bit-by-bit subtraction back into the second register when the contents of the second register is not less than the contents of the first register;

(H) subtracting the contents of the first register after step (G) from the contents of the second register after step (G) bit-by-bit and loading the subtracted contents back into the second register when the contents of the second register after step (G) are not less than the contents of the first register after step (G);

(I) right shifting the contents of the first and second registers after steps (G) and (H) by n−1 bits;

(J) performing p $P_{field}$ operations on the contents of the second register after step (I); and (K) using the contents of the second register after step (J) to one of encrypt or decrypt the message.

11. The method of claim 10, wherein $p=\log_2(k)-1$.

12. The method of claim 10, wherein step (J) includes a step of performing p $P_{field}$ operations using the contents of the second register after step (I) when the contents of the second register after step (I) are less than the contents of the first register after step (I).

13. The method of claim 10, wherein step (J) includes steps of:
 subtracting the contents of the first register from the contents of the second register bit-by-bit and loading the result of the bit-by-bit subtraction back into the second register when the contents of the second register after step (I) are not less than the contents of the first register after step (I) prior to performing the p $P_{field}$ operations.

* * * * *